US012585952B1

(12) United States Patent　　　　(10) Patent No.:　US 12,585,952 B1
Baumer et al.　　　　　　　　　　　(45) Date of Patent:　Mar. 24, 2026

(54) DYNAMIC CREATIVITY SHAPING IN LANGUAGE MODELS

(71) Applicant: INTUIT INC., Mountain View, CA (US)

(72) Inventors: Hadas Baumer, Tel Aviv (IL); Gad Markovits, Tel Aviv (IL); Shon Mendelson, Tel Aviv (IL); Kaaleb Edery, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/287,162

(22) Filed: Jul. 31, 2025

(51) Int. Cl.
　　G06N 3/082　　　(2023.01)
　　G06N 3/048　　　(2023.01)
(52) U.S. Cl.
　　CPC ............. G06N 3/082 (2013.01); G06N 3/048 (2023.01)
(58) Field of Classification Search
　　None
　　See application file for complete search history.

(56)　　　　　References Cited

PUBLICATIONS

Vishwakarma, Harit, et al. "Prune'n Predict: Optimizing LLM Decision-making with Conformal Prediction." Forty-second International Conference on Machine Learning. Jul. 2025. (Year: 2025).*
Li, Tung-Ling, and Hongliang Liu. "Logit-Gap Steering: Efficient Short-Suffix Jailbreaks for Aligned Large Language Models." arXiv preprint arXiv:2506.24056 (Jun. 2, 2025). (Year: 2025).*
Zhang et al., "EDT: Improving Large Language Models' Generation by Entropy-based Dynamic Temperature Sampling", arXiv:2403.14541v2 [cs.CL], Apr. 3, 2024.

* cited by examiner

*Primary Examiner* — Eric Nilsson
(74) *Attorney, Agent, or Firm* — DLA PIPER LLP US

(57)　　　　　ABSTRACT

At least one processor can receive at least one preliminary response generated by a machine learning (ML) model having a predetermined level of randomness. The at least one processor can determine at least one transformation applying a new level of randomness, different from the predetermined level of randomness, to the at least one preliminary response. The at least one processor can generate at least one modified preliminary response, the generating comprising applying the at least one transformation to the at least one preliminary response. The at least one processor can replace the at least one preliminary response with the at least one modified preliminary response within the ML model, wherein the ML model generates a final response using the at least one modified preliminary response.

20 Claims, 7 Drawing Sheets

200

300

400

402 – receive preliminary response (e.g., logits)

404 – determine transformation (e.g., distribution cutoff coefficient and/or alpha)

406 – generate modified response (e.g., transform logits with softmax function)

408 – replace preliminary response with modified response

600

DYNAMIC CREATIVITY SHAPING IN LANGUAGE MODELS

BACKGROUND

Large Language Models (LLMs), while capable of generating coherent text, struggle to produce outputs with contextually varying degrees of creativity or "surprise" within the same sentence or output segment. Existing methods, such as static temperature scaling, apply a uniform randomness level across the entire output, failing to capture the nuanced creative variations required for complex tasks. This limitation hinders the ability to generate text that is both contextually accurate and dynamically creative, leading to outputs that may lack the desired level of localized surprise or fail to adapt to varying creative requirements within a single response.

BRIEF DESCRIPTIONS OF THE DRAWINGS

DETAILED DESCRIPTION OF SEVERAL EMBODIMENTS

Systems and methods described herein can include an adaptive probability shaping mechanism that can dynamically adjust the token probability distribution within LLMs to create contextually nuanced creativity. By learning optimal distribution transformation parameters from external datasets and incorporating a real-time judgment system, the systems and methods described herein can enable LLMs to generate text with dynamically varying creativity, allowing for localized "creativity" and improved alignment with complex task requirements. This can significantly enhance flexibility and control over LLM-generated content, enabling more sophisticated and contextually rich LLM outputs.

Figure 1:
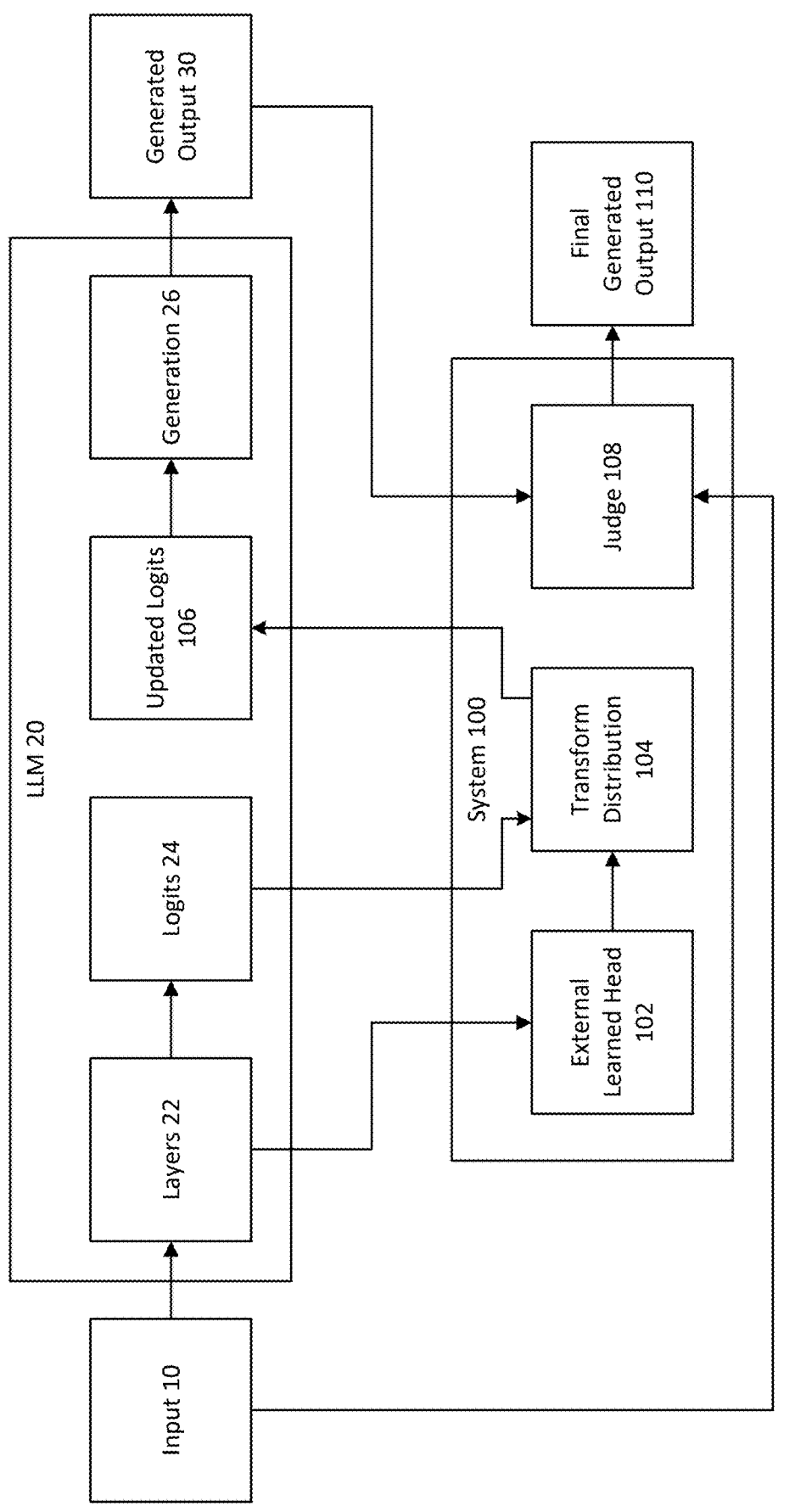
FIG. 1 shows an example dynamic creativity shaping system and machine learning model according to some embodiments of the disclosure.

FIG. 1 shows an example dynamic creativity shaping system 100 and machine learning (ML) model 20 according to some embodiments of the disclosure. System 100 may include and/or generate one or more modules and/or data elements, such as external learned head 102, transform distribution 104, and/or judge 108. ML model (in the illustrated example, an LLM 20) may include layers 22 and/or generation 26 elements. System 100 may be in communication with LLM 20, for example through one or more networks such as the Internet. As described in detail below, LLM 20 may receive input 10 (e.g., from a client device that may be in communication with LLM 20 through the one or more networks) and process input 10 using layers 20 to produce logits 22. System 100 may process outputs of LLM

20 processing, such as logits 22, and produce updated logits 106. Generation processing 26 (e.g., accomplished by additional layer(s)) of LLM 20 may use updated logits 106 to produce generated output 30. In some embodiments, the client may receive generated output 30 in response to input 10. In other embodiments, judge 108 of system 100 can process generated output 30 to produce final generated output 110, which the client may receive in response to input 10. This is described in detail below with reference to FIGS. 2-6.

Illustrated components may include a variety of hardware, firmware, and/or software components that may interact with one another. Some components shown in FIG. 1 may communicate with one another using networks. For example, system 100 may communicate with LLM 20 through one or more networks (e.g., the Internet, an intranet, and/or one or more networks that provide a cloud environment). In some embodiments, elements of system 100 may communicate with one another through the one or more networks. Each component may be implemented by one or more computers (e.g., as described below with respect to FIG. 7).

Elements illustrated in FIG. 1 (e.g., input 10, LLM 20, layers 22, logits 24, generation processing 26, generated output 30, system 100, external learned head 102, transform distribution 104, updated logits 106, judge 108, and/or final generated output 110) are each depicted as single blocks for ease of illustration, but those of ordinary skill in the art will appreciate that these may be embodied in different forms for different implementations. For example, while separate modules of LLM 20 and/or system 100 are depicted separately, any combination of these elements may be part of a combined hardware, firmware, and/or software element. Also, while one input 10, one LLM 20, one set of layers 22, one set of logits 24, one generation processing 26, one generated output 30, one system 100, one external learned head 102, one transform distribution 104, one set of updated logits 106, one judge 108, and one final generated output 110 are shown, this is for clarity only, and multiples of any of the above elements may be present. In practice, there may be single instances or multiples of any of the illustrated elements, and/or these elements may be combined or co-located. For example, LLM 20 and system 100 may be parts of a combined overall system.

In the following descriptions of how the illustrated components function, several examples are presented. However, those of ordinary skill in the art will appreciate that these examples are merely for illustration, and the disclosed embodiments are extendable to other application and data contexts.

Figure 2:
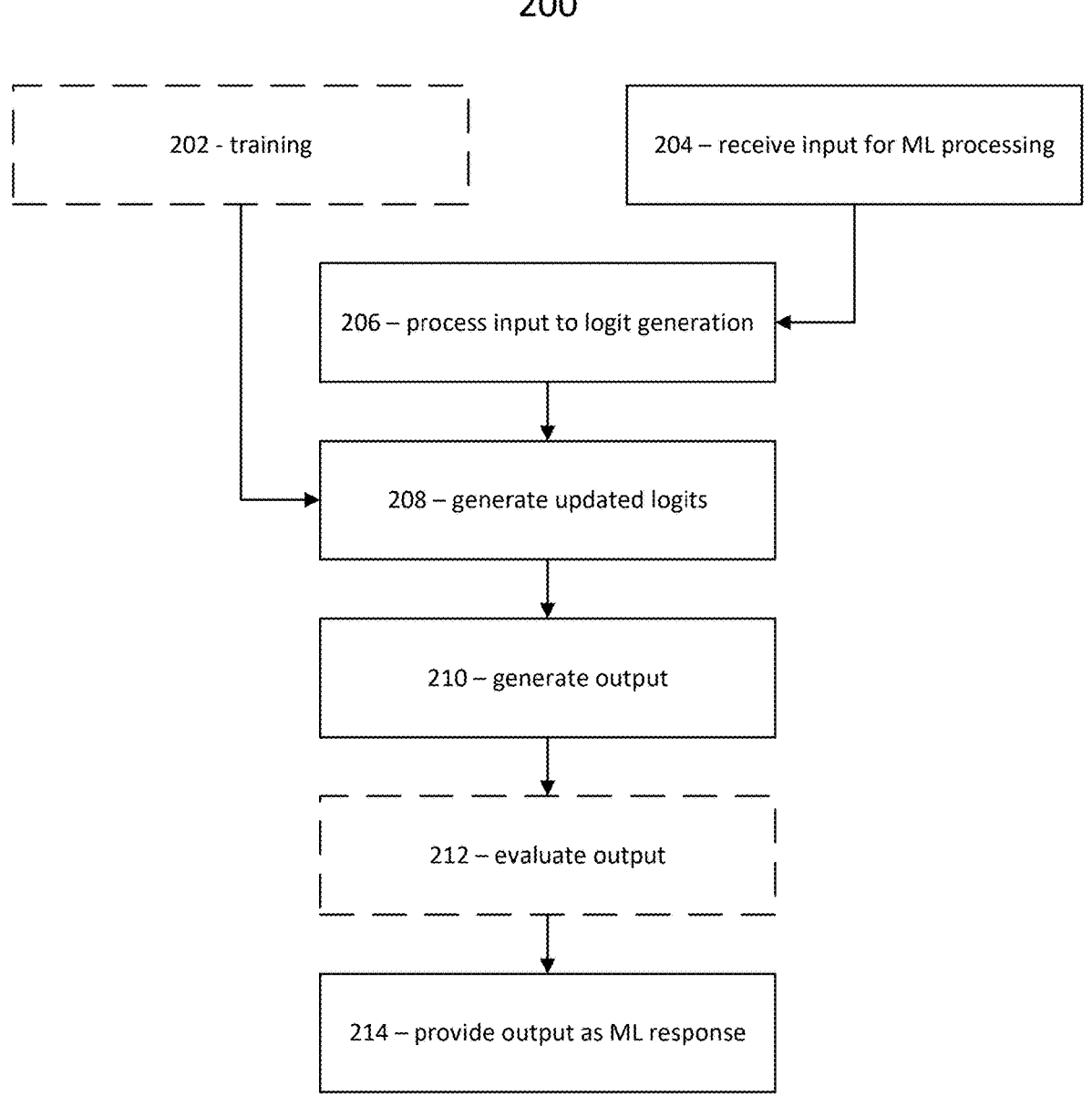
FIG. 2 shows an example automatic text generation process according to some embodiments of the disclosure.

FIG. 2 shows an example automatic text generation process 200 according to some embodiments of the disclosure. For example, LLM 20 and system 100 may perform process 200 in response to an input 10 to LLM 20, for example a prompt causing LLM 20 to generate a response such as generated output 30. By performing process 200, LLM 20 and system 100 can produce a response to the prompt that may be both contextually accurate and dynamically creative, particularly when compared with a standard response by LLM 20 generated without performing process 200.

At 202, system 100 may perform training in at least some instances, such as prior to performing the rest of process 200 for the first time and/or as a retraining procedure for system 100. For example, as described below, system 100 may use a modified softmax function in at least some embodiments to generate modified logits. The modified softmax function can use parameters such as a distribution cutoff coefficient and/or an alpha parameter to transform logits generated by LLM 20. At 202, system 100 can be trained to learn the distribution cutoff coefficient and/or the alpha parameter.

Figure 3:
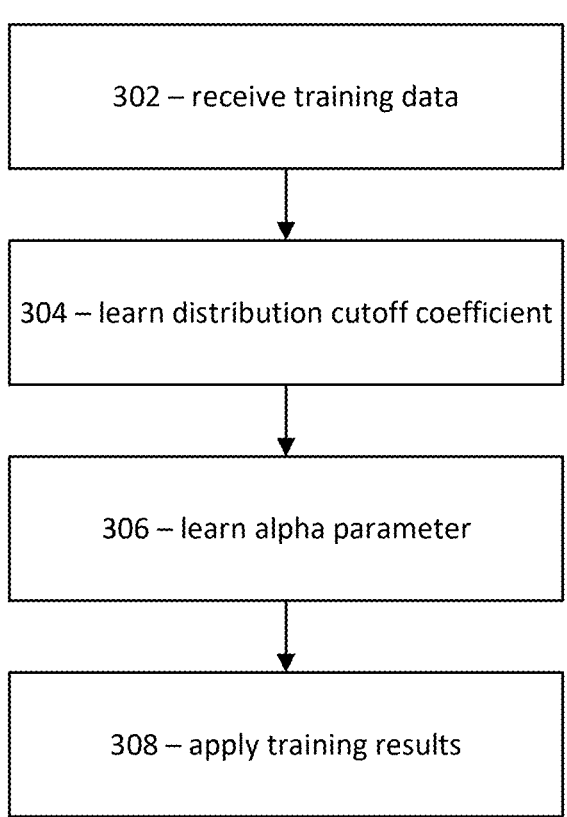
FIG. 3 shows an example training process according to some embodiments of the disclosure.

FIG. 3 shows an example training process 300 according to some embodiments of the disclosure. System 100 may perform training process 300 to train external learned head 102 to learn the distribution cutoff coefficient and/or the alpha parameter, for example at 202 of process 200. External learned head 102 may be a tunable component external to any frozen pre-trained LLM, therefore being much lighter and easier to tune than the entire LLM.

At 302, system 100 may receive training data. A variety of data may be used as training data, but in at least some embodiments, the training data may be selected according to the following considerations.

To reduce noise, training data may exclude cases where apparent dynamic creativity exists without actual changes in the probability distribution. For example, the training data set may exclude data that the base model was already trained on, where it can predict tokens with high confidence regardless of the creativity level. Therefore, in at least some embodiments, the training data may include only data created after the base model's last training timestamp.

To capture diverse "creativity types," the training data may include data from a wide range of data sources, such as new songs, books, articles, recipes, patents, and marketing campaigns. Additionally, incorporating texts like news articles, wikipedia pages, and court rulings can provide examples of lower creativity, which may promote balanced and comprehensive training coverage.

To promote the presence of high-quality creative examples, in some embodiments, an LLM may act as a judge to evaluate the creativity within the dataset by assessing originality, diversity, and novelty of the content. The LLM may be prompted to analyze each data point, assigning quality scores based on creative merit, uniqueness, and innovative value. Data scoring above some threshold value (s) may be included within the training data, while low scoring data may be excluded.

At 304, system 100 may learn a distribution cutoff coefficient. The distribution cutoff coefficient may shape which part of the logit distribution will have the most effect on the final outcome. For example, the distribution cutoff coefficient may range between 0 and 0.5, with 0.5 skewing the probability distribution towards the tokens with the median probability in the distribution (e.g., not the most probable, but also not deferring the most improbable).

To learn the distribution cutoff coefficient, system 100 may attempt to achieve the objective of accurately identifying an optimal cutoff coefficient that relates to the quantile position of a known (e.g., ground-truth) token within a predicted probability distribution. For each training example, system 100 may compute the known token's position within the cumulative probability distribution (e.g., its quantile). System 100 may then train the predicted cutoff coefficient (dist_cutpred) to match this quantile position. For example, system 100 may employ a standard regression-based loss function, such as Mean Squared Error (MSE), with an additional normalization factor to stabilize training across varying distributions, such as the following:

$$\text{Loss}_{dist\_cut} = \frac{1}{N}\sum_{i=1}^{N}(\text{dist\_cut}_{pred}^{(i)} - \text{quantile}_{actual}^{(i)})^2 + \lambda_{norm}\|\text{dist\_cut}_{pred}\|^2$$

4 where dist_cut$_{pred}^{(i)}$ is the predicted cutoff coefficient for the i-th example, quantile$_{actual}^{(i)}$ is the actual quantile of the known token within the probability distribution for the i-th example, and $\lambda_{norm}$ is the normalization factor to regularize the predicted coefficient.

At 306, system 100 may learn an alpha parameter. Alpha may shape the overall "surprise" or predictability of the output. For example, higher absolute values of alpha may tend to sharpen the probability distribution, making an LLM more deterministic and less "surprising." In other words, a higher absolute value of alpha may result in higher logit values dominating the probability distribution. Lower absolute values of alpha may flatten the distribution, increasing randomness and "surprise" in the output. In other words, a lower absolute value of alpha may make the probability distribution more uniform. Negative values of alpha may shift the probabilities towards least probable tokens.

Once the cutoff coefficient is established, system 100 may learn the alpha parameter. Alpha can control the sharpness or flatness of the probability distribution around the previously learned cutoff quantile. To train $\alpha$ effectively, system 100 may generate multiple samples around the established quantile cutoff and evaluate their appropriateness using judge 108 (e.g., a small LLM configured to evaluate responses and/or some other evaluation technique). For example, system 100 may sample tokens using various $\alpha$ values around the learned cutoff. Each sampled text may be evaluated by the judge LLM, which may provide a coherence and creativity relevance score. For example, the judge 108 may evaluate the samples using the same or similar technique as described below with respect to FIG. 6. System 100 can optimize alpha to maximize this evaluation score, meaning if sampled texts are consistently judged as less sensible or coherent, the optimal alpha should move toward smaller absolute values (more uniform and less aggressive reshaping). The loss function for alpha can thus be formulated as a reinforcement-style reward maximization (policy gradient), for example as follows:

$$\nabla_{\alpha}\mathcal{J}(\alpha)=\mathbb{E}\left[J(y_{sampled}|\alpha)\nabla_{\alpha}\log P(y_{sampled}|\alpha)\right]$$

where J(Ysampled|α) is the evaluation score from judge 108 for the sampled tokens at a given alpha, and P(Ysampled|α) is the probability of the sampled tokens given the current alpha parameter.

If judge 108 frequently assigns low evaluation scores, system 100 may adjust $\alpha$ accordingly, moving toward less extreme reshaping of the distribution (e.g., smaller absolute alpha values).

At 308, system 100 may apply training results. For example, after training as described above, external learned head 102 may be ready to evaluate preliminary response data generated by ML activity, such as logits generated by LLM 20. For example, returning to FIG. 2, at 204, LLM 20 may receive input 10, and input 10 may be processed by LLM 20 and system 100 as follows.

At 206, LLM 20 may process input 10. LLM 20 may perform any processing that can provide a preliminary response, such as logits or other weights, that can be accessed. For example, many open source LLMs provide access to their layers, including a layer producing the logits, so it may be straightforward for system 100 to obtain logits from an open source LLM 20 by any technique specified by the open source LLM 20 and/or its developers. In a case where system 100 has access to a closed LLM's layers (e.g., at least the layer producing the logits), system 100 can work with a closed LLM 20 in similar fashion to the open LLM 20.

At 208, system 100 may generate at least one modified preliminary response such as updated logits. For example, system 100 can process the preliminary response obtained at 206 using external learned head 102 as trained at 202, thereby transforming the preliminary response having a predetermined level of randomness to a modified preliminary response having a different level of randomness.

Figure 4:
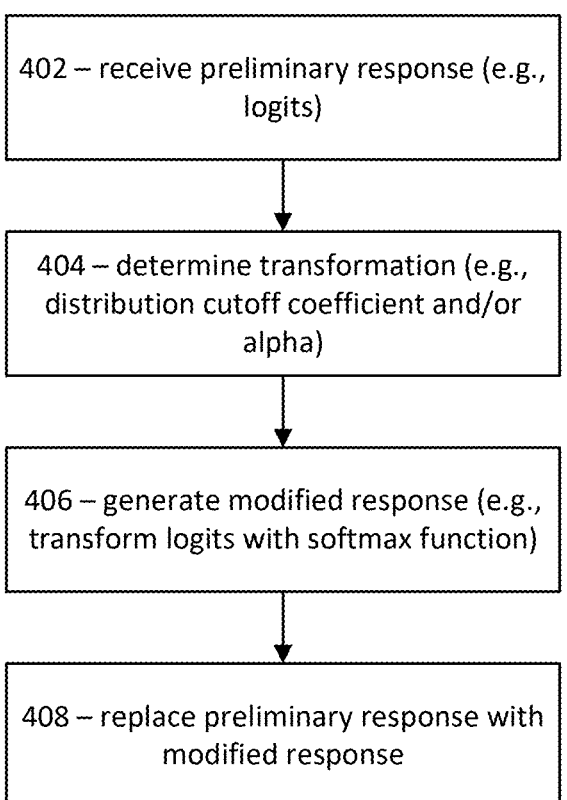
FIG. 4 shows an example dynamic creativity shaping process according to some embodiments of the disclosure.

FIG. 4 shows an example dynamic creativity shaping process 400 according to some embodiments of the disclosure. System 100 may perform dynamic creativity shaping process 400 to generate at least one modified preliminary response, such as one or more modified logit values, for example at 208 of process 200.

At 402, system 100 can receive the preliminary response. External learned head 102 may be connected to a layer 22 output of LLM 20 (e.g., the second attention layer output in some embodiments) in order to allow it to refer to the tokens that are generated there. For example, when LLM 20 is processing input 10, it may generate weights at each layer 22, which may include the logits of interest for process 400. System 100 can insert a layer 22 into LLM 20 that obtains the logits 24 and provides them to external learned head 102 in some embodiments. In other embodiments, system 100 can access the logits 24 through other access features provided by LLM 20 in any known or novel manner.

At 404, system 100 can determine at least one transformation. The at least one transformation may apply a new level of randomness, different from the predetermined level of randomness, to the preliminary response. For example, the transformation may change a logit value to a different logit value having a higher or lower level of randomness.

To determine the transformation, external learned head 102 can process the preliminary response. For example, external learned head 102 can take logit values as inputs and, applying the training results and algorithms described above, determine an optimal distribution cutoff coefficient and/or an optimal alpha parameter for the logit values. As noted above, the distribution cutoff coefficient may apply a modification to a position of the at least one preliminary response within a probability distribution of responses. As noted above, the alpha parameter (e.g., which may be expressed as an absolute value) may apply a modification to a shape of the probability distribution of responses affecting the at least one preliminary response. Accordingly, by identifying an optimal distribution cutoff coefficient and/or an optimal alpha parameter, external learned head 102 can change a logit transformation function to get different effects.

At 406, system 100 can generate a modified preliminary response. For example, transform distribution 104 can apply the transformation determined at 404 to logits 24, thereby producing updated logits 106. Updated logits 106 can therefore be calculated to have the optimal distribution cutoff coefficient and/or the optimal alpha parameter.

For example, system 100 can apply the transformation using a softmax function using the transformation (e.g., the optimal distribution cutoff coefficient and/or the optimal alpha parameter) and the logits 24 as at least some of the function parameters. This can be a modified softmax function (e.g., gamma_temperature_softmax) with a distance-based gamma-like logit transformation and temperature scaling. This function may transform logits 24 by calculating their distance from a lower quantile-based cutoff (the optimal distribution cutoff coefficient), scaling these distances with a modified gamma-like parameter (the alpha parameter), and then applying temperature scaling and softmax. The cutoff may be a lower quantile (e.g., between 0 and 0.5 inclusive). In some embodiments, transform distribution 104 can compute updated logits 106 as an array of probabilities, for example according to the following logic:

$$\text{logits\_diff=np.abs(logits-dist\_cut)}$$

$$\text{modified\_logits=(logits\_diff*-np.abs(alpha))}$$

$$\text{exp\_logits=np.exp(modified\_logits)}$$

$$\text{probabilities=exp\_logits/np.sum exp\_logits)}$$

where "logits" are the input logits 24, "dist_cut" is the optimal distribution cutoff coefficient, "alpha" is the alpha parameter, and "probabilities" are the output, with the calculation of "modified_logits" being the softmax function. It may be possible to vary the calculation from the above example to achieve different specific randomness and/or accuracy balance, but in any case, system 100 can generate a modified preliminary response.

At 408, system 100 can replace the preliminary response with the modified preliminary response. For example, system 100 can insert updated logits 106 as a layer in LLM 20 and/or otherwise provide updated logits 106 to LLM 20 for continued processing by LLM 20. As a result, it may be expected that LLM 20 will produce a response to input 10 that has an appropriate level of accuracy and a higher degree of surprise than would have been possible prior to the replacing.

Figure 5:
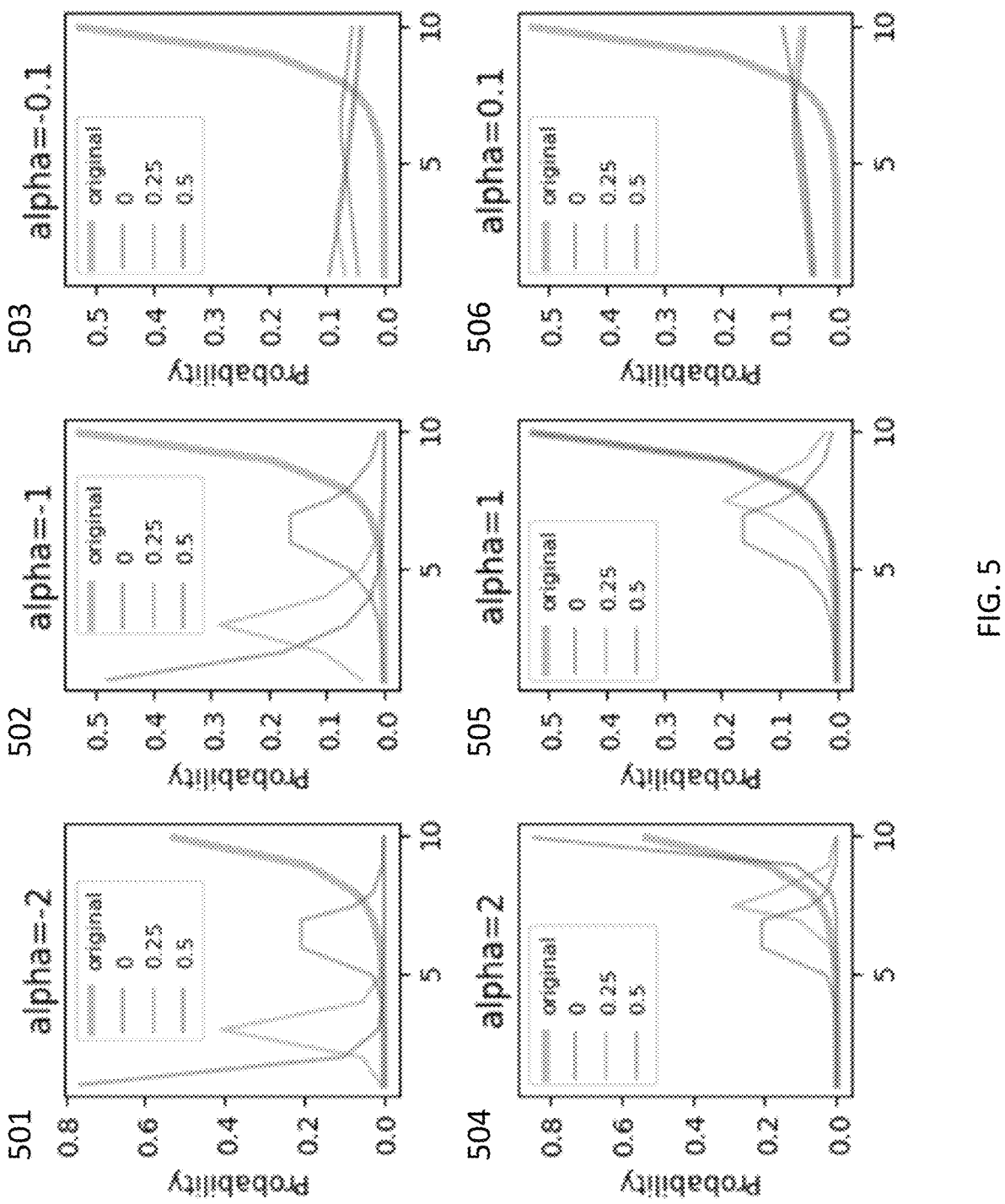
FIG. 5 shows example response distribution sets for various attributes according to some embodiments of the disclosure.

FIG. 5 shows example response distribution sets 501-506 for various attributes according to some embodiments of the disclosure. For each distribution set 501-506, the alpha value used to generate the distribution set 501-506 is above the graph, and the graph key shows different distribution cutoff coefficients used with the given alpha value. In each distribution set 501-506, the original logits 24 generate a curve with a highest probability of selection for a very small number of responses at the right side of the curve (e.g., where the x axis provides a schematic representation of tokens ordered by their original logit values from lowest on the left to highest on the right). As can be seen from the distribution sets 501-506, negative alpha values such as in 501-503 can result in distributions with more creative (but perhaps more incorrect) responses, while positive alpha values such as in 504-506 can increase creativity without deviating as far from the most common response. It can also be seen that as distribution cutoff coefficients increase, the distribution of responses can become more varied about a midpoint.

Returning to FIG. 2, at 210, LLM 20 may produce generated output 30 using the modified preliminary response. For example, LLM 20 may continue processing through generation 26, using updated logits 106 according to its own internal organization and/or algorithms, and thereby produce generated output 30.

In some embodiments, processing may proceed to 214, and LLM 20 and/or system 100 may provide a response to input 10 received at 204. In such embodiments, the response can include generated output 30. In other embodiments, processing may proceed to 212, and system 100 may evaluate generated output 30 before LLM 20 and/or system 100 provide a response to input 10 received at 204.

Figure 6:
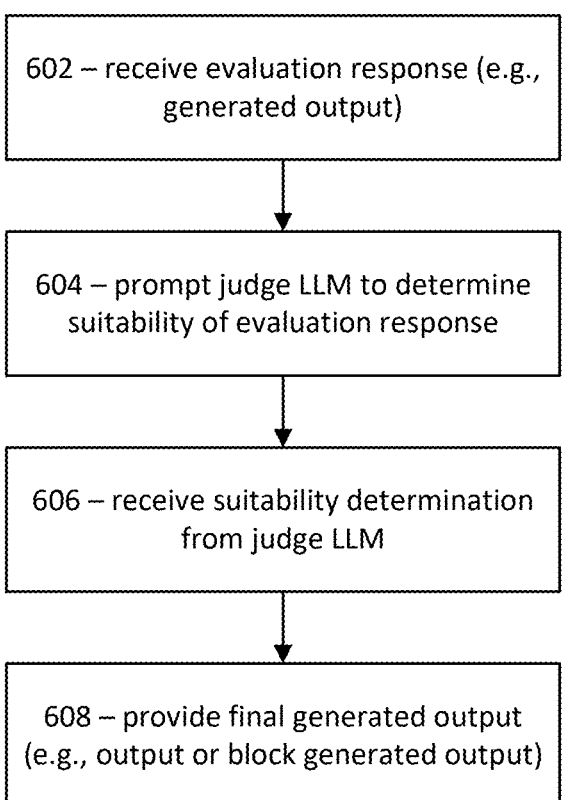
FIG. 6 shows an example response evaluation process according to some embodiments of the disclosure.

FIG. 6 shows an example response evaluation process 600 according to some embodiments of the disclosure. System 100 may perform response evaluation process 600 to evaluate outputs generated using the modified preliminary response, for example at 210 of process 200.

At 602, system 100 may receive generated output 30 as an evaluation response. At 604, system 100 may process the evaluation response using judge 108, for example prompting a judge LLM to determine a suitability of the evaluation response. The judge LLM can be a state of the art LLM or a smaller LLM that may have been fine-tuned to evaluate responses, where fine-tuning may be performed by distillation from a more state of the art model, for example.

At 606, system 100 can receive a result of processing at 604, for example receiving a suitability determination from the judge LLM. In some embodiments, the suitability determination can include feedback on the evaluation response's relevance to the task, coherence, and requested level of creativity. In some embodiments, the suitability determination may be a passing or failing determination or score. In some embodiments, the suitability determination may include one or more changes to the evaluation response.

The following is an example prompt that system 100 can give to the judge LLM at 604 to obtain the result at 606. The following example prompt is included to demonstrate how an LLM can be operated to evaluate generated output 30. Different prompts, and/or modifications to the following prompt, that cause similar evaluation may be used in other embodiments.

You are an expert evaluator. Your role is to assess a generated text snippet for its quality based on two criteria: coherence (is it logical and well-written?) and relevance to the user's task. Based on the context below, provide a single holistic quality score from 0.0 to 1.0. A score of 1.0 means the text is perfectly coherent and highly relevant to the task. A score below 0.7 means the text is unacceptable.

Your output should be in a json format and include:
{'score':<selected score>, 'explanation':<explanation>}

User's Task: {user_request_placeholder}

Generated Text to Evaluate: {generated_text_placeholder}

At 608, system 100 can provide final generated output 110. Final generated output 110 may include generated output 30 in cases where judge 108 provides a passing indication at 606. Final generated output 110 may include a response message indicating a response cannot be generated, or similar, in cases where judge 108 provides a failing indication at 606. Final generated output 110 may include a modified version of generated output 30 in cases where judge 108 introduces one or more changes to the evaluation response at 606. In embodiments of system 100 wherein process 600 is performed, LLM 20 and/or system 100 may provide final generated output 110 as the response to input 10 at 214 of process 200.

Figure 7:
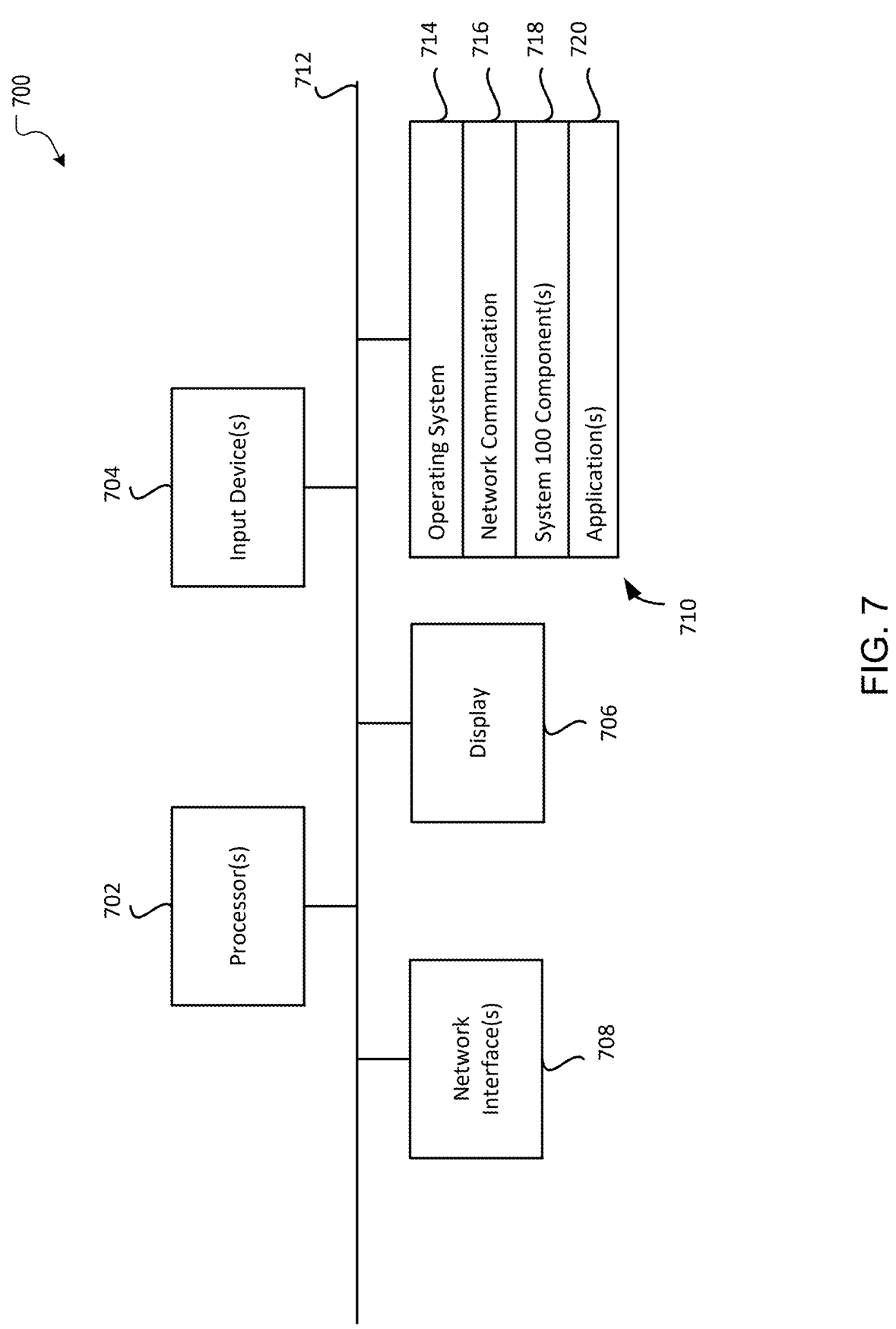
FIG. 7 shows an example computing device according to some embodiments of the disclosure.

FIG. 7 shows a computing device 700 according to some embodiments of the disclosure. For example, computing device 700 may function as one or more of system 100, a device providing LLM 20, and/or any portion(s) thereof, and/or multiple computing devices 700 may function as one or more of system 100, devices providing LLM 20, and/or any portion(s) thereof.

Computing device 700 may be implemented on any electronic device that runs software applications derived from compiled instructions, including without limitation personal computers, servers, smart phones, media players, electronic tablets, game consoles, email devices, etc. In some implementations, computing device 700 may include one or more processors 702, one or more input devices 704, one or more display devices 706, one or more network interfaces 708, and one or more computer-readable mediums 710. Each of these components may be coupled by bus 712, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 712 may be any known internal or external bus technology, including but not limited to ISA, EISA, PCI, PCI Express, NuBus, USB, Serial ATA or FireWire. In some embodiments, some or all devices shown as coupled by bus 712 may not be coupled to one another by a physical bus, but by a network connection, for example. Computer-readable medium 710 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 may establish and maintain network connections (e.g., software for implementing communication protocols, such as TCP/IP, HTTP, Ethernet, telephony, etc.).

System 100 components 718 may include instructions for performing the processing described herein. For example, system 100 components 718 may provide instructions for implementing system 100 elements and/or performing processes 200, 300, 400, 600, and/or portions thereof. Application(s) 720 may be an application that uses or implements the outcome of processes described herein and/or other processes. In some embodiments, the various processes may also be implemented in operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:
   receiving, by at least one processor, at least one preliminary response generated by a machine learning (ML) model having a predetermined level of randomness;
   determining, by the at least one processor, at least one transformation applying a new level of randomness, different from the predetermined level of randomness, to the at least one preliminary response;
   generating, by the at least one processor, at least one modified preliminary response, the generating comprising applying the at least one transformation to the at least one preliminary response; and
   replacing, by the at least one processor, the at least one preliminary response with the at least one modified preliminary response within the ML model, the replacing comprising generating a layer including the at least one modified preliminary response by processing performed externally to the ML model and inserting the layer into the model, wherein the ML model generates a final response using the at least one modified preliminary response.

2. The method of claim 1, wherein:
   the ML model comprises a plurality of existing layers; and
   the layer is added to the plurality of existing layers by the replacing.

3. The method of claim 1, wherein the at least one transformation includes at least one of:
   a modification to a position of the at least one preliminary response within a probability distribution of responses; and a modification to a shape of the probability distribution of responses affecting the at least one preliminary response.

4. The method of claim 1, wherein the at least one preliminary response includes at least one logit value.

5. The method of claim 4, wherein the generating comprises transforming the at least one logit value by applying a softmax function using the at least one transformation as at least one function parameter.

6. The method of claim 1, wherein the replacing comprises:

obtaining the final response;

evaluating the final response by prompting a judge large language model with a prompt comprising the final response and receiving a determination of suitability from the judge large language model; and in response to the determination of suitability, causing the ML model to output the final response.

7. A method comprising:

receiving, by at least one processor, at least one logit value generated by a large language model (LLM) having a predetermined level of randomness;

determining, by the at least one processor, at least one transformation applying a new level of randomness, different from the predetermined level of randomness, to the at least one logit value;

calculating, by the at least one processor, at least one modified logit value by applying at least one function to the at least one logit value and the at least one transformation; and replacing, by the at least one processor, the at least one logit value with the at least one modified logit value within the LLM, the replacing comprising generating a layer including the at least one modified logit value by processing performed externally to the ML model and inserting the layer into the model, wherein the LLM generates a final response using the at least one modified logit value.

8. The method of claim 7, wherein:

the LLM comprises a plurality of existing layers; and the layer is added to the plurality of existing layers by the replacing.

9. The method of claim 7, wherein the at least one function comprises a softmax function using the at least one transformation as at least one function parameter.

10. The method of claim 7, wherein the at least one transformation includes a modification to a position of the at least one preliminary response within a probability distribution of responses.

11. The method of claim 10, further comprising performing, by the at least one processor, training to identify an optimal cutoff coefficient for the probability distribution of responses, wherein the modification to the position is determined according to a result of the training.

12. The method of claim 7, wherein the at least one transformation includes a modification to a shape of a probability distribution of responses.

13. The method of claim 12, further comprising performing, by the at least one processor, training to identify an optimal absolute value for the modification to the shape of the probability distribution of responses, wherein the modification to the shape is determined according to a result of the training.

14. The method of claim 7, wherein the replacing comprises:

obtaining the final response;

evaluating the final response by prompting a judge large language model with a prompt comprising the final response and receiving a determination of suitability from the judge large language model; and in response to the determination of suitability, causing the ML model to output the final response.

15. A non-transitory computer-readable medium storing instructions that, when executed by at least one processor, cause the at least one processor to perform processing comprising:

receiving at least one preliminary response generated by a machine learning (ML) model having a predetermined level of randomness;

determining at least one transformation applying a new level of randomness, different from the predetermined level of randomness, to the at least one preliminary response;

generating at least one modified preliminary response, the generating comprising applying the at least one transformation to the at least one preliminary response; and replacing the at least one preliminary response with the at least one modified preliminary response within the ML model, the replacing comprising generating a layer including the at least one modified preliminary response by processing performed externally to the ML model and inserting the layer into the model, wherein the ML model generates a final response using the at least one modified preliminary response.

16. The non-transitory computer-readable medium of claim 15, wherein:

the ML model comprises a plurality of layers; and the layer is added to the plurality of existing layers by the replacing.

17. The non-transitory computer-readable medium of claim 15, wherein the at least one transformation includes at least one of:

a modification to a position of the at least one preliminary response within a probability distribution of responses; and a modification to a shape of the probability distribution of responses affecting the at least one preliminary response.

18. The non-transitory computer-readable medium of claim 15, wherein the at least one preliminary response includes at least one logit value.

19. The non-transitory computer-readable medium of claim 18, wherein the generating comprises transforming the at least one logit value by applying a softmax function using the at least one transformation as at least one function parameter.

20. The non-transitory computer-readable medium of claim 15, wherein the replacing comprises:

obtaining the final response;

evaluating the final response by prompting a judge large language model with a prompt comprising the final response and receiving a determination of suitability from the judge large language model; and in response to the determination of suitability, causing the ML model to output the final response.

*    *    *    *    *